United States Patent
Dietzsch et al.

[11] 3,938,633
[45] Feb. 17, 1976

[54] MOTOR CHAIN SAW

[75] Inventors: Gunter Dietzsch, Schmiden; Gerd Frers, Neustadt; Dieter Wieland, Neckarrems, all of Germany

[73] Assignee: Andreas Stihl Maschinenfabrik, Germany

[22] Filed: Feb. 14, 1973

[21] Appl. No.: 332,259

[30] Foreign Application Priority Data
Feb. 2, 1972 Germany............................ 2207088
May 13, 1972 Germany............................ 2223472

[52] U.S. Cl. ........................ 192/48.3; 192/105 BA
[51] Int. Cl.² ......................................... F16D 47/00
[58] Field of Search.. 192/48.3, 48.2, 48.5, 105 BA, 192/103 B, 48.4

[56] References Cited
UNITED STATES PATENTS

| | | | |
|---|---|---|---|
| 2,068,185 | 1/1937 | Kreis ............................ | 192/105 BA |
| 3,369,638 | 2/1968 | Hunt et al.......................... | 192/48.3 |
| 3,503,478 | 3/1970 | Neumann........................... | 192/48.3 |
| 3,785,465 | 1/1974 | Johansson ..................... | 192/105 BA |

FOREIGN PATENTS OR APPLICATIONS

| | | | |
|---|---|---|---|
| 399,780 | 7/1924 | Germany........................... | 192/48.3 |
| 410,252 | 5/1934 | United Kingdom................ | 192/48.3 |

*Primary Examiner*—Samuel Scott
*Assistant Examiner*—Weeley S. Ratliff, Jr.
*Attorney, Agent, or Firm*—Walter Becker

[57] ABSTRACT

A motor chain saw in which serially arranged clutches are interposed between the motor output shaft and the chain of the saw. The clutches include a centrifugal clutch and a mechanically controlled clutch. The mechanically controlled clutch has at least one drive element having an engaged position and a disengaged position and is acted on by centrifugal force urging it toward the position which it occupies. A spring urges the device element toward engaged position with a force less than the centrifugal force which acts on the drive element above a certain speed. The mechanically controlled clutch includes at least one control operable to move the drive element in at least disengaging direction during rotation of the clutch.

29 Claims, 28 Drawing Figures

MOTOR CHAIN SAW

The present invention relates to motor chain saws with a drive sprocket for the chain saw, which sprocket is driven by a motor through a centrifugal clutch, or the like. While a second clutch is provided which acts as safety clutch and forms a manually disengageable intermediate clutch in the driving connection between the motor and the drive sprocket, said intermediate clutch having at least a disengageable follower-up member for connecting the pertaining two clutch elements.

It is an object of the present invention so to design a motor chain saw, especially an intermediate clutch of the above mentioned general type, that a fast disengagement and engagement of the intermediate clutch will be possible without affecting the safe function of the motor chain saw.

These and other objects and advantages of the present invention will appear more clearly from the following specification in connection with the accompanying drawings, in which.

The motor chain saw according to the present invention which has a disengageable follower member for connecting the two pertaining clutch parts together is characterized primarily in that the follower member is connected to a centrifugal element having its center of gravity located outside the rotatable shaft of the intermediate clutch, said center of gravity being displaceable relative to the mounting of the centrifugal element in such a way that the follower element in its disengaged position is at least above a predetermined speed urged by centrifugal force to stay in this position. The invention is furthermore characterized by a release connected to the follower element or member for moving said follower member to its disengaging position while the motor saw has mounted thereon an abutment which is manually movable into the range of rotation of the release so that in a simple manner a disengagement of the follower member or intermediate clutch can be effected.

The above outlined objects may also be realized according to the invention by an arrangement which is characterized in that the follower member which in disengaging position with regard to this position is under the load of the centrifugal force, is connected to a shiftable element movable into two control positions and arrestable therein. This shiftable element is only in the direction for disengagement automatically connected to the follower member by means of a follower. Moreover, the shiftable element comprises two release members for moving the shiftable element into its two control positions. Furthermore, for each release member the motor saw has arranged thereon a handle, or the like, with an abutment movable into the range of rotation of said release members. When the disengagement abutment is actuated, the intermediate clutch disengages while said disengagement abutment will again be located outside the range of movement of the pertaining release member. If the speed drops below a certain speed at which the intermediate clutch is to be engaged again, the follower member will, in spite of the spring force acting upon the follower member in engaging direction not move into the engaging position because it is retained in the disengaging position by the shiftable member, for instance, in a positive manner. If, however, previously the engaging abutment was moved into the range of movement of the pertaining release member, the shiftable member is moved into its engaging position whereby in this instance the engagement abutment will likewise be located outside the range of movement of the pertaining release member. When the shiftable member occupies its engaging position, the follower member is held in its disengaging position only by the centrifugal forces acting thereupon so that when the speed of the chain saw drops below said predetermined speed, the spring force acting upon the follower member will be greater than the centrifugal force so that the follower member will then be moved to its engaging position. Each release member thus will, after being actuated once by the pertaining abutment, move into a position in which it no longer engages the pertaining abutment so that it will be avoided that the release member abuts with each revolution of the intermediate clutch against the abutment and thereby causes considerable noise and high wear.

For the shiftable member it is important that it is held in its respective shifted position. This may be realized either by the centrifugal principle or by other suitable arresting devices as, for instance, a pressure spring. Such pressure spring is arranged substantially transverse to the direction of the shifting movement of the shiftable member and presses the same from its intermediate position characterized by highest compression toward the outside into the respective end position. However, also resilient arresting means are possible. With regard to the follower member, it is important that it be carried along by the shiftable member moving in disengaging direction and that thereby an effective disengagement is brought about. It is also possible that the disengagement release member is provided directly on the follower member and that the latter, for instance, will then move the shiftable member to its disengaging position. The follower member will, however, follow the engaging movement of the shiftable member only when a certain speed is not exceeded whereas at higher speeds the relative movement occurs between the shiftable member and the follower member, inasmuch as while the shiftable member can without difficulties be moved to its engaging position, the follower member will stop and only when the speed of the saw drops below the limit speed will trail the shiftable member and accordingly will bring about the engaging or coupling operation proper. To this end, the automatic movement of the follower member by the shiftable member in disengaging position is provided. The center of gravity of the centrifugal element is at least in the disengaged position located in disengaging direction in such a way that with the shiftable member occupying the disengaging position the follower member will automatically likewise be held in this position. In view of the shift spring having a certain thrust acting against the centrifugal force upon the follower member, it will be realized that with the speed of rotation dropping and thus with reduced centrifugal force, the return force of the shift spring prevails and moves also the follower member into engaging position. The shiftable member was already engaged before. The shift spring may by a change in the location of the center of gravity of the centrifugal element be so aided that now the centrifugal force acts in the engaging direction. The shiftable element may thus have only two defined and free controllable shifting or end positions into which it can be moved mechanically, electromagnetically, or in any other suitable way. The disengaging position can be carried out only by the shiftable element and the follower element together, whereas the engaging movement can, in conformity with the control command, be carried out by the shiftable element alone. The follower member will follow only when the speed of the saw drops below a certain speed.

Figure 1:
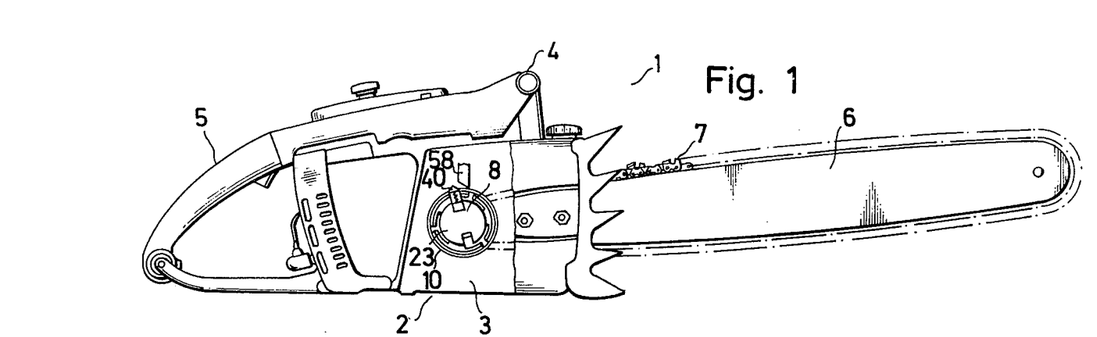
FIG. 1 illustrates a side view partially cut open of a motor chain saw according to the present invention.

Referring now to the drawings in detail, FIG. 1 illustrates a motor chain saw 1 with a driving unit 2 and a motor housing 3 in which a high speed internal combustion engine is arranged. The motor chain saw is furthermore provided with handles 4 and 5 for holding and handling the motor chain saw. The front end face of the driving unit 2 is provided with a guiding rail 6 for a saw chain 7 which is driven by the motor, more specifically from the output shaft of the motor forming a crankshaft 8 through a double clutch 10 arranged on one side of the housing 3 and protected toward the outside. The double clutch 10 has a drive sprocket wheel 9 (FIG. 3), said wheel 9 being located between the double clutch 10 and the pertaining side wall of the motor housing 3. Sprocket wheel 9 may, if desired, also be located on the outside, i.e., at the outer end of the crankshaft.

Figure 2:
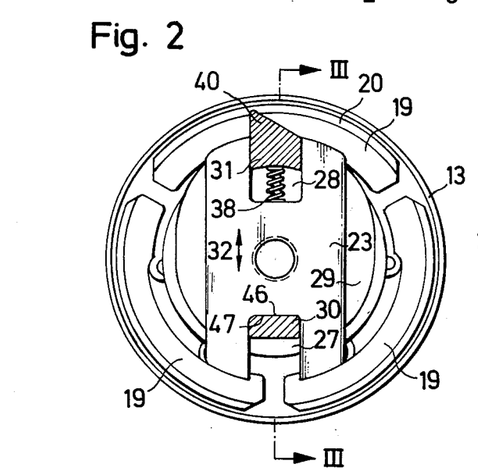
FIG. 2 shows the clutch according to the invention used in connection with the motor chain saw of FIG. 1, but illustrated on a considerably larger scale than that of FIG. 1.
Figure 3:
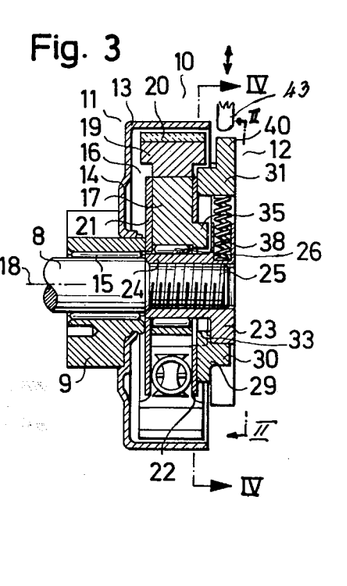
FIG. 3 represents a section taken along the line III—III of FIG. 2.
Figure 4:
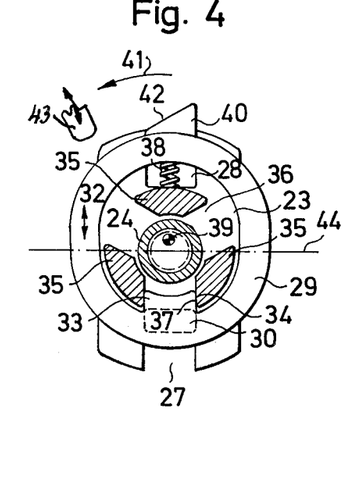
FIG. 4 is a partial section taken along the line IV—IV of FIG. 3

The double clutch 10 comprises according to FIGS. 2–4 a centrifugal clutch 11 and a preferably coaxially arranged intermediate clutch 12 which represents a safety clutch and is structurally united to the double clutch 10. The centrifugal clutch 11 consists primarily of a clutch drum 13 which has the outside of its end face wall 14 provided with the drive chain sprocket wheel 9 which is non-rotatably connected to the clutch drum 13. The sprocket wheel 9 together with the clutch drum 13 is by means of a needle bearing 15 rotatably journalled on the crankshaft 8. A fly-weight rotor 16 is arranged in the clutch drum 13 and includes a star-shaped rotor support 17 which has for instance three radially projecting links having radially displaceably arranged thereon and uniformly distributed about the rotary shaft 18 of clutch 10 annular segmental fly-weights 19. The weights 19 may have their outer edges provided with friction linings 20 by means of which they may engage the inner mantle surface of the mantle portion of clutch drum 13 so that the latter and thus the sprocket wheel 9 will be frictionally moved. At both end face sides of the rotor support 17 there are connected lateral guiding plates 21, 22 by means of which the fly-weights 19 are in axial direction of clutch 10 secured relative to the rotor support 17.

The intermediate clutch 12 consists primarily of a disc-shaped drive clutch member 23 which is located on that side of the fly-weight rotor 16 which is located opposite the wall 14. The clutch part 23 is by means of a sleeve-shaped hub 24 protruding toward wall 14 non-rotatably arranged on the outer thread of the free end section 25 of crankshaft 8 which section 25 is reduced in diameter. Mounted on hub 24 by means of a needle bearing 26 is the rotor support 17 of the fly-weight rotor 16. The fly-weight rotor 16 forms the output clutch member of the intermediate clutch 12. However, it is not necessary that the intermediate clutch and the double clutch are directly mounted on the crankshaft.

The drive clutch member 23 of the intermediate clutch 12 is in conformity with FIGS. 2 and 4 designed centrally symmetrical with regard to the rotary shaft 18 and has a substantially H-shaped form, so that the part 23 forms two guiding slots 27, 28 which are in alignment with each other and are diametrically located opposite to each other. In these slots 27, 28 is provided a follower member 29 with two cams 30, 31 which is displaceable diametrically with regard to the clutch 10. This follower member is substantially oval and its longer oval axis is located in its displacement direction indicated by the arrow 32. The follower member 29 is partially located within the axial extension of the disc-shaped driving clutch part 23 but otherwise is located exclusively only on the end face side which faces toward the fly-weight rotor 16. At the inner circumferential surface of the rotor 16, the follower member 29 has a substantially rectangular cam 33 which projects radially inwardly toward the shaft of rotation 18 of clutch 10. Cam 33 is designed as follower cam and at least one of its side surfaces 34 forms a follower surface. The rotor support 17 of the fly-weight rotor 16 has for instance three extensions 35 which are uniformly distributed around the circumference and are located radially inwardly. These extensions 35 are annular segmental and project axially into the follower member 29 to such an extent that the follower member 29 will, when the fly-weight rotor 16 is at a standstill, nevertheless be able to rotate about the shaft 18. By each two adjacent extensions 35 there is formed a radial slot 36 for engagement by the follower cam 33. One side surface 37 each of each slot 36 forms a counter surface for the follower surface 34. The follower member 29 may be displaced in the direction of the arrow 32 in such a way that its follower cam 33 in disengaged position is located radially outside the extensions 35 and in its engaged position engages a slot 36 between said two extensions 35. As a result thereof, depending on the position of the follower member 29 of the drive clutch part 23, the intermediate clutch 12 may or may not be rotated relative to the fly-weight rotor 16.

Resting on that side of shaft 18 of clutch 10, which side is located opposite to the follower cam 33, there rests a helical pressure spring 38 in radial bore of the driving part 23 of the clutch. The helical pressure spring 38 has its radial outer end resting on the inner side of the pertaining slide cam 31 of the follower member 29 so that the latter is under the load of a spring urged toward its engaged position relative to the drive coupling part 23. In this engaged position which is illustrated in FIGS. 2–4, the center of gravity 39 pertaining to follower element 29 and located in the longer axis will be located on the same side of the rotary shaft of clutch 10 as spring 38, whereas when the follower member 29 is in disengaged position, the center of gravity 39 is located on the oppositely located side of shaft 18 namely, on that side on which the follower cam 33 is provided.

On that outside which is diametrically opposite to the follower cam 33, the follower member 29 has a release cam 40 which is formed by a radial extension of cam 31. This release cam 40 has an ascending surface 42 which with regard to the working rotary direction indicated by the arrow 41 of the clutch is inclined. Within the range of rotation of the release cam 40 of the follower member 29 occupying its engaged position, there is movably arranged an abutment 43. Abutment 43 is adjustable approximately radially with regard to the shaft 18 and is adjustably rotated on the pertaining side surface of the motor housing 3 by means of a handle not further illustrated. The abutment 43 advantageously has a correspondingly inclined counter surface. When the abutment 43 occupies its radial inner position, the release cam 40 with its surface 42 moves onto the abutment 43 so that the follower member 29 will against the thrust of spring 38 be so displaced that its follower cam 33 will disengage the fly-weight rotor 16 and its center of gravity 39 will be located on the same side of the axial plane 44 of clutch 10 which is rectangular with regard to its direction of replacement (arrow 32), on which also the follower cam 33 is located. If with this disengaged position of the follower member 29 the speed of the latter is so high that the centrifugal force acting thereupon is greater than the thrust of spring 38, the follower member 29 is retained by centrifugal force in its disengaged position. Only when the speed drops below a predetermined value and the force of the spring 38 is greater than the centrifugal force acting upon the follower member 29 for bringing about a disengagement of the clutch, the follower member 29 is by spring 38 moved into engaged position. The center of gravity 39 will then be located on the opposite side of the axial plane 44 so that the centrifugal force now acts upon the follower member 29 in the direction toward the engaging position and thus aids the spring 38. When the follower member 29 occupies its disengaging position, the fly-weight rotor 16 and thus the driving chain sprocket wheel 9 is not driven, whereas when the follower member 29 occupies its engaging position, the fly-weight rotor 16 is driven so that the fly-weights 19 will be able to turn the clutch drum 13 and thus drive the saw chain.

That lateral guiding plate 22 of the fly-weight rotor 16 which is located at the drive clutch part 23, may be preloaded in a dish spring-like manner in such a way that it frictionally rests against that end face of the follower member 29 which faces toward said guiding plate 22 and/or of the clutch part 23 so that said plate 22 acts as synchronizing element and transfers a torque from the clutch part 23 to the fly-weight rotor 16. As a result thereof, the fly-weight rotor 16 is prior to the transfer of the follower member 29 to its engaging position moved in the rotary direction so that a relatively easy engagement of the follower cam 33 will be assured. It is also possible to design the other lateral guiding plate 21 as synchronizing element while said other lateral guiding plate 21 rests for instance frictionally against the flange of crankshaft 8, which flange is arranged adjacent the end section 25 of crankshaft 8.

Figures 5, 6, 8, 9:
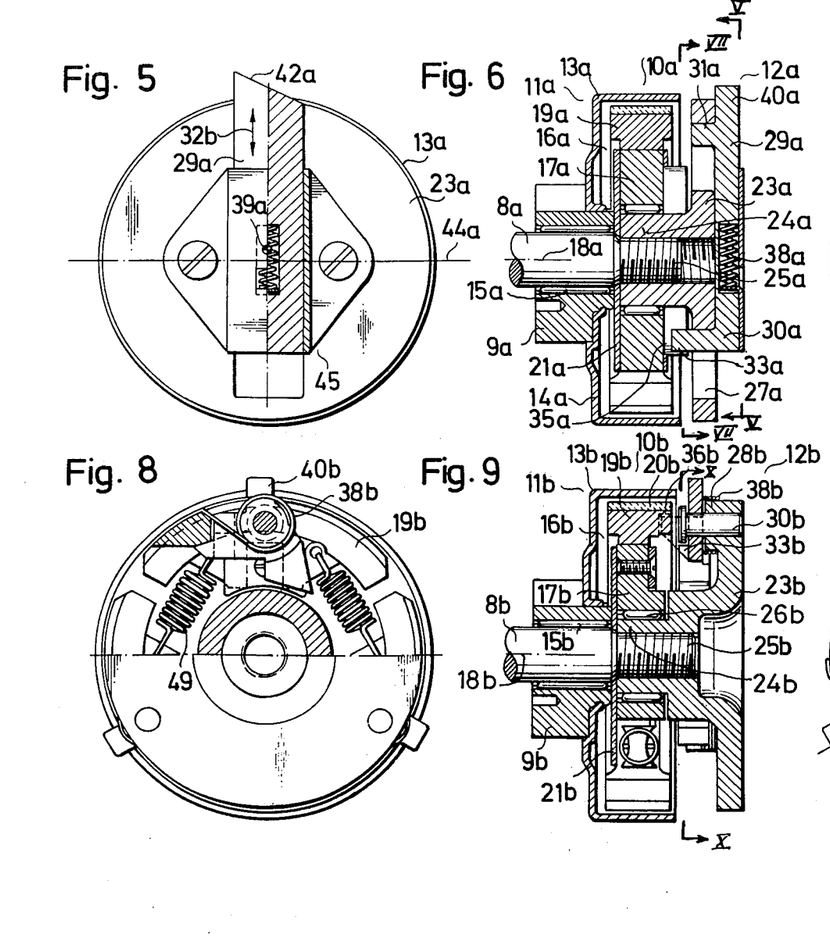
FIGS. 5 – 19 respectively illustrate five additional embodiments of clutches according to the present invention and illustrated somewhat similar to FIGS. 2 – 4.
Figure 7:
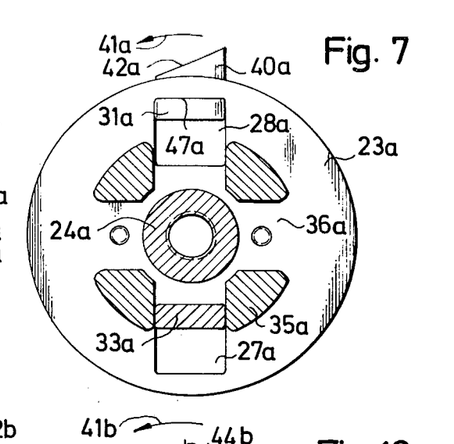

Referring now to FIGS. 5 – 7, those elements therein which correspond to the elements in FIGS. 2 – 4 have been designated with the same reference numerals as in FIGS. 2 – 4, but with the character *a* added thereto. Similarly, those elements of FIGS. 8 – 10 which correspond to those of FIGS. 2 – 4 have been designated with the same reference numerals, as in FIGS. 2 – 4, but with the character *b* added.

With the embodiment illustrated in FIGS. 5–7, the follower member 29 is located substantially on that outer side of the driving clutch part 23a of intermediate clutch 12a which faces away from the centrifugal clutch 11a. The follower member 29a is by means of cams 30a, 31a guided in recesses 27a, 28a of the driving clutch part 23a. An extension of one sliding cam 30a simultaneously forms the follower cam 33a. With this embodiment, four engageable slots 36 are uniformly distributed about the rotary shaft for engagement by the follower cam 33a. These slots 36a are formed by extensions 35a of the rotor support 17a of the flyweight rotor 16a. For purposes of additionally guiding the flat rod-shaped follower member 29a, the outer end face of the clutch part 23a has a clamp-shaped sheet metal housing 45 connected thereto by means of screws, the housing serving as slide guiding means 29a. From the web of the housing 45 is bent rectangularly inwardly a plate against which spring 38 rests. With this embodiment, the lateral guiding plate 21a located at the sprocket wheel 9a is designed as dish spring-shaped synchronizing element which by engagement with the collar of the crankshaft 8a establishes a frictional engagement with the end face of hub 24 of clutch part 23a and with the rotor support 17a of the flyweight rotor 16a.

With the embodiment of FIGS. 1–4, the follower member 29 is as to its engaging position limited by an abutment in such a way that that surface 46 of slide cam 30 which points toward the rotary shaft 18 abuts the corresponding end surface 47 of the pertaining slot 27. A similar situation prevails with the embodiment according to FIGS. 5 – 7 according to which both slide cams 30a and 31a abut against the pertaining end faces 47a of the recesses 27a, 28a.

Figure 10:
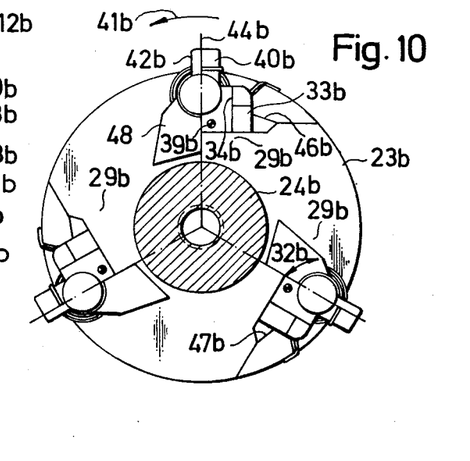

According to the embodiment illustrated in FIGS. 8–10, three follower members 29b are provided which are substantially uniformly distributed about the rotary shaft 18b of clutch 10b. These follower members 29b are designed as pivotable levers which are pivotally supported by shafts which are parallel to the clutch shaft 18b. These pivotable shafts are located in the radial outer range of the driving clutch part 23b. The follower members 29b are located on that end face of the clutch part 23b which faces toward the centrifugal clutch 11b and, more specifically, are journalled on an eye-shaped protrusion 28b. As pivotal mount there is provided a pivotal bearing bolt 30b which is inserted into the driving clutch part 23b, for instance, with press fit. The head or collar of bolt 30b is located on that side of the follower member 29b which faces toward the centrifugal clutch 11b. Arranged around each eye 28b is a helical leg spring 38b which by means of one leg rests against the driving clutch part 23b and by means of its other leg rests against the follower member 29b in such a way that member 29b is spring-loaded or spring-urged into its engaged position.

The respective follower member 29b is substantially angle lever-shaped while one leg includes the follower cam 33b which projects toward the flyweight rotor 16b, whereas the other leg forms the release member 40b which radially projects beyond the driving clutch part 23b.

A further leg 48 which is located opposite the follower cam 33b serves as counter weight. The follower surface 34b of the follower member 29b is located on that side of the follower cam 33b which faces toward the pivot bearing bolt 30b so that the follower member 29b in its engaged position pulls and carries along the flyweight rotor 16b. On that side of the follower cam 33b which faces away from the follower surface 34b, the follower cam 33b has an extension with an inclined abutment surface 46b. This abutment surface 46b will in engaged position rest against a corresponding counter surface 47b of a pertaining extension of the driving clutch part 23b while also the leg of the pertaining spring 38b will rest against the same extension.

With this embodiment, a pocket-shaped opening 36b is provided for the follower cam 33b of each follower member 29b on each fly-weight 19b and, more specifically, on that side thereof which faces toward the driving clutch part 23b. The opening 36b forms the counter surface for the follower surface 34b and is open toward the clutch shaft 18b so that the follower cam 33b can by a corresponding pivotal movement of the follower member 29b be moved out of the recess 36b whereby the intermediate clutch 12b can be disengaged. The center of gravity 39b of each follower member 29b is in engaged position of the respective follower member 29b located on that axial plane of the clutch which passes through the pivot axis of the pertaining follower member 29b. On this axial plane there is also located the follower surface 34b. The center of gravity 39b is located radially further inwardly than the pivot axis of the follower member 29b. When the follower member 29b is pivoted from its engaged position to the disengaged position, the center of gravity moves to the oppositely located side of this axial plane 44b so that then the centrifugal force acting upon the follower member 29b will urge the follower member toward its disengaged position. The counter surface for the follower surface 34b which is formed by the recess 34b is parallel to the direction of the flyweight 19b pertaining thereto so that the latter will be able also with the follower member 29b in its engaged position to carry out radial movements.

FIG. 8 shows tangential tension springs 49 by means of which adjacent flyweights 19b are connected to each other in such a way that they are spring-urged inwardly toward the clutch shaft 18b. That surface of the follower cam 33b which faces away from the follower surface 34b may in conformity with the invention be so designed that the output clutch part 16b of the intermediate clutch 12b will also in the rotary direction opposite to the direction of rotation indicated by the arrow 41b be carried along while the intermediate clutch 12b thus is substantially evenly effective in both directions of rotation. In this instance, also the engagement recesses 36b on the flyweight rotor 16b may, for instance, be designed as pockets in such a way that they have two counter surfaces located opposite to each other for the two follower surfaces of the respective follower cam 33b. By means of this design, it will be assured above all that the wear of the follower cams, which in particular due to lack of uniformity of the circumferential speed of the clutch when rotating in the direction of the arrow 41b is relatively great, can be substantially reduced. A similar design is, of course, also possible with all embodiments described so far.

Figure 11:
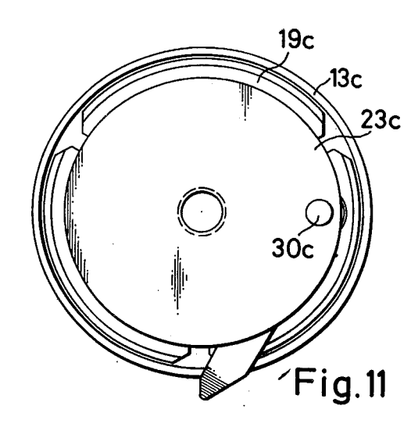
Figure 12:
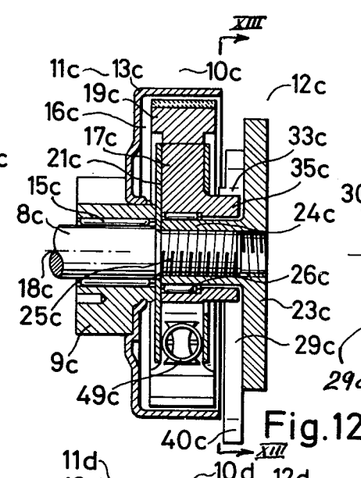
Figure 13:
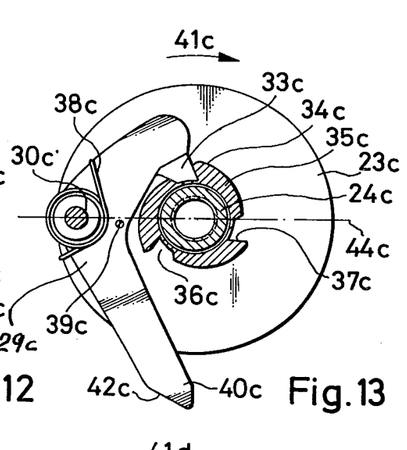

According to the embodiment illustrated in FIGS. 11–13, the follower member 29c is provided in the form of at least one pawl which by means of a pivot bearing bolt 30c is in an axis parallel manner to the clutch shaft 18c pivotally mounted on that side of the driving clutch part 23c which faces toward the centrifugal clutch 11c. The pawl 29c forms an obtuse angle which opens toward the clutch shaft 18c and is provided on the shorter leg of the follower cam 33c directed toward the clutch shaft. The counter surfaces 37c associated with the follower surface 34c of the follower member 29c are formed by a ratchet wheel 35c which advantageously forms one single piece with the rotor support 17c of the flyweight rotor 16c and protrudes beyond the end face thereof toward the driving clutch part 23c. The ratchet wheel 35c has tooth space-shaped cutouts 36c, for instance, three cutouts, uniformly distributed over the circumference and respectively forming a counter surface 37c. The follower cams 33c precisely fit into the cutouts 36c. Arranged around the pivot shaft of the follower member 29c is a helical leg spring 38c which, on the one hand, rests against a shorter leg of the follower member 29c and, on the other hand, rests against the driving clutch part 23c in such a way that the follower member 29c is spring-loaded toward its engaged position. The pawl 29c is so arranged that it will be able in engaged position to carry along the flyweight rotor 16c while pushing the same. Instead of the outer teeth, the ratchet wheel may also have inner teeth. Furthermore, it may be expedient to provide a plurality of pawls.

The longer leg of the follower member 29c forms with its end the release cam 40c with the surface 42c inclined with regard to the direction of rotation.

Figure 14:
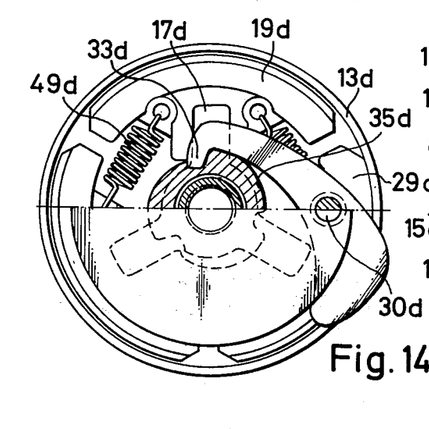
Figures 15, 16:
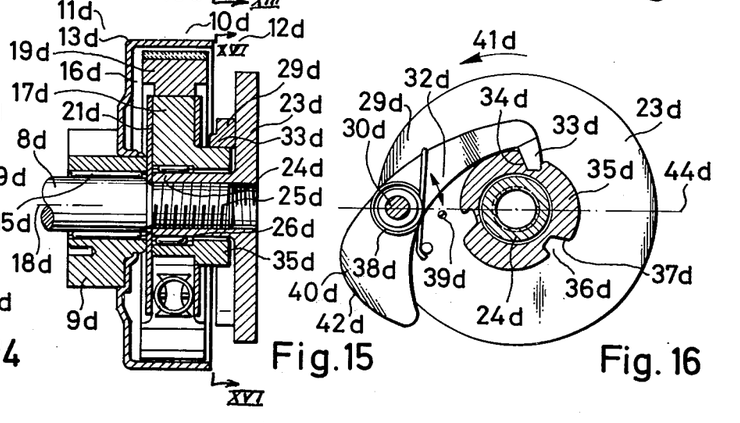

In contrast to the embodiment of FIGS. 11–13, according to the embodiment of FIGS. 14–16, the follower member 29d pulls the flyweight rotor 16d in the direction of rotation indicated by the arrow 41d. The follower member 29d is designed in the manner of a two-arm lever which is concavely curved toward the clutch shaft 18d and forms a latch. This latch is mounted in a manner similar to the manner shown in FIGS. 11–13, but the follower surface 34d of the follower cam 33d is provided on that side of cam 33d which is located toward the pivot bearing bolt 30d. Correspondingly, also the counter surfaces 37d on the ratchet wheel 34d are, in contrast to the embodiment of FIGS. 11–13, provided on the oppositely located sides of the recesses 36d.

That leg of the latch 29d which is located opposite to the follower cam 33d forms a bulging release cam 40d which has a convexly ascending surface 42d formed by the edge of the latch 29.

By combining the pawl 29c according to FIGS. 11–13 with a latch 29d according to FIGS. 14–16, the intermediate clutch may be so designed that it will be effective in both directions of rotation. The latch and the pawl may be journalled on a common pivot bearing bolt on the driving clutch part of the intermediate clutch.

Figure 17:
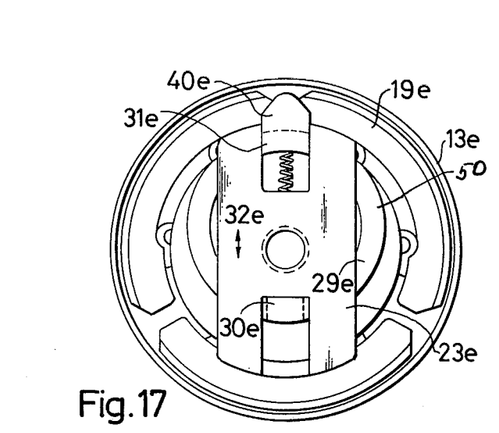
Figures 18, 19:
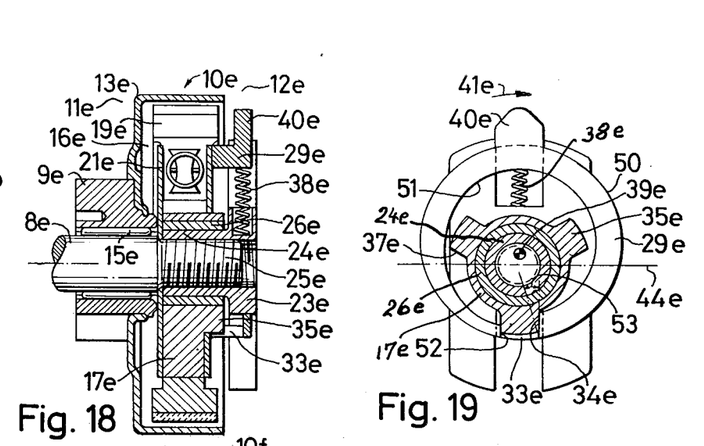

According to the embodiment illustrated in FIGS. 17–19, the axially projecting cams 35e of the rotor support 17e are formed by the fact that on one end face of the rotor support 17e, the radial arms thereof on which the flyweights 19e are guided are turned at the outer circumference down to a smaller diameter and thereby form the axially projecting cams 35e. The annular follower member 29e has one end face thereof provided with a recess 33e for engagement by one of the follower cams 35e while one lateral surface 34e of this recess 33e forms the follower surface.

The outer circumferential surface 50 of the follower member 29e is circular or cylindrical while merely the release cam 40e projects beyond this outer circumference. The inner circumferential surface 41, however, extends from the follower surface 34e to the oppositely located lateral surface 52 of the follower recess 33 is a spirally widening manner in such a way that this oppositely located surface 52 is considerably lower than the follower surface 34e and that this inner circumferential surface 51 forms a sliding surface for the respective cam 35e prior to the latter being engaged by the follower surface 34e when the intermediate clutch 12e is moved to its engaged position. If a radial beam of the clutch rotary shaft is drawn against the radial outer edge of the follower surface 34e, this beam forms with the follower surface 34e an acute angle 53 opening toward the rotary clutch shaft.

Figure 20:
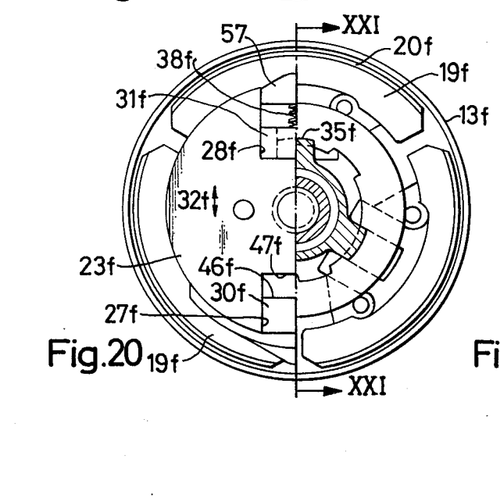
FIG. 20 is still another embodiment of a clutch according to the invention and is illustrated partially in view and partially in section while being shown in approximately its natural size.
Figure 21:
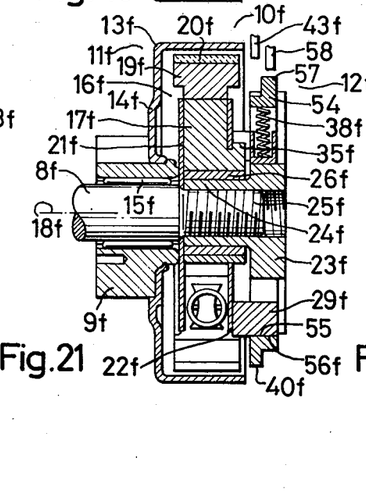
FIG. 21 is a section taken along the line XXI—XXI of FIG. 20.
Figure 22:
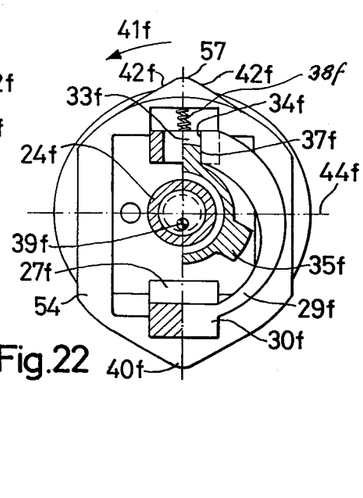
FIG. 22 represents a section along two different sectional planes through the clutch of FIG. 21.

According to the embodiment illustrated in FIGS. 20–22, there is provided a shiftable or control member 54 which is likewise displaceable in the direction of the arrow 32 f. This member 54 partially surrounds the follower member 29f and is mounted on the follower member 29f or on the drive clutch part 23f of the intermediate clutch 12f. The member 54 is likewise annular shaped but is approximately of a rectangular-annular shape. On the same side of the rotary shaft of the intermediate clutch on which also the follower 33f of the follower member 29f is provided, a helical pressure spring 38f is arranged between the follower member 29f and the control member 54. The pressure spring 38f is located in that axial plane of the intermediate clutch which represents the plane of symmetry of the follower 33f. The helical pressure spring 38f rests in a radial bore of the follower member 29f and against the inner surface of the control member 54. Instead of helical pressure springs, also other springs of other forms and types such as bending pressure springs may be employed.

When the follower member 29f is in its engaged position, its center of gravity 39f is located on that side of the rotary shaft of the intermediate clutch which faces away from the follower 33f, so that the follower member 29f during the rotation of the clutch is by the centrifugal force held in its engaged position. The center of gravity of the control member 54 which in this position (when seen in the axial direction of the clutch) may coincide with the center of gravity 39f of the follower member 29f, is likewise located on this side of the rotary shaft of the intermediate clutch. When the follower member 29f is in its engaged position, the control member 54 rests by means of a control surface 55 positively against a counter surface 56 of the follower member 29f in such a way that the follower member 29f during a movement of the control member 54 in disengaging position is positively and automatically taken along. According to the illustrated embodiment, the surface 55 is formed by that inner surface of the control member 54 which is located opposite the follower 33f, said follower member 33f engaging said inner surface of the control member 54. When the two members 29f, 54 have been moved into disengaged position, their centers of gravity 39f are located on the other side of the rotary shaft of the intermediate clutch, which means on that side on which also the follower 33f is provided. From this position, the control member 54 occupying its engaged position may be moved into its engaging-control position while the follower member 29f is likewise by means of spring 38f carried along, but not positively. If the speed of the intermediate clutch is so high that the centrifugal force acting upon the follower member 29f in the direction toward the disengaging position is greater than the force of the spring 38f, the follower member 29f remains in its disengaged position even though the control member 54 occupies its engaging control position. Only when the speed drops below the corresponding limit speed, the spring force will exceed the centrifugal force so that the follower member 29f is moved into its engaging position. The control member 54 may be held in its engaging position, for instance, by centrifugal force, when its mass exceeds that of the follower member 29f. However, it is also possible to hold the control member 54 by means of a resilient ratchet wheel, or the like, in its engaging-control position so that the position of its center of gravity with regard to the centrifugal force effect may be selected different from the illustrated embodiment.

The control member 54 has two diametrically oppositely located release cams 40f, 57 which are located symmetrically with regard to the axial plane of the intermediate clutch, which plane is parallel to the displacing direction indicated by the arrow 32f, while the releasing cams are formed by radial extensions or protrusions of the control member 54. The two release cams 40f, 57 are located in separate rotary planes which are directly adjacent to each other and are at a right angle to the clutch shaft. These release cams 40f, 57 respectively have ascending surfaces 42f which are inclined according to the direction of rotation indicated by the arrow 41f. Inasmuch as the clutch is also suitable for an oppositely directed rotation, inclined surfaces 42f are provided on both sides of each release cam. An abutment 43f is movably located in the range of rotation of the release cam 40f which forms a disengagement release and is diametrically located opposite the follower 33f. This abutment 43f is adjustable approximately radially with regard to the rotary shaft 18f and is located on the pertaining side of the motor housing 3 while in a non-illustrated manner through the braking system during the actuation of the chain brake of the motor chain saw the abutment 43f is adapted through the brake linkage during the actuation of the chain brake of the motor chain saw to be moved to its radial inner coasting and stopping position. If the abutment 43f occupies its radial inner position, the release cam 40f moves onto the abutment 43f so that the control member 54 will while positively taking along the follower member 29f be so displaced that the follower 33f will disengage the flyweight rotor 16f so that the two members 29f, 54 will occupy the described disengaging position. The control member 54 moves so far that the release cam 40f can no longer abut the abutment 43f. The abutment 43f is so arranged that it can in no position contact the other release cam 54. Within the range of rotation of this release cam 57 (acting as engagement release) of the control member 54 occupying a disengaging position, there is provided a second abutment 58 which is movable approximately radially with regard to the rotary shaft 18f which may likewise be actuated, for instance, by a brake linkage, but in such a way that when releasing the chain brake it will be radially inwardly moved to its abutment engaging position while the other abutment 43f is pulled back to such an extent that under no circumstances can it engage the pertaining release cam 40f. The two abutments 43f, 58 are thus alternately shifted while the abutment 58 is so arranged that it cannot engage the release cam 40f. If the abutment 58 occupies its radial inner position, the release cam 57 moves thereagainst so that the control member 54 against the thrust of spring 38f thereagainst the centrifugal force acting thereupon is moved into the engaging-control position illustrated in FIG. 21. The control member 54 is displaced to such an extent that in spite of the abutment 58 occupying its abutting position, the release cam can no longer engage the abutment 58. If this displacement of the control member 54 occurs above the mentioned limit speed, the follower member remains in its disengaged position, and only after the speed drops below said limit speed, the follower member 29f will, due to the thrust of spring 38f, follow the control member 54 into the engaging position according to FIG. 21.

Instead of the parallelly displaceably mounting of the control member according to FIGS. 20 – 22, these two members may also be displaceably mounted transverse or at a right angle to each other and to the clutch shaft. In this instance, the deviation of the forced connection of these two elements is expediently effected by a correspondingly profiled control coulisse on a member which coulisse is, for instance, provided on the inner edge of the control member and slides on the outer edge of the follower member.

Figures 23, 24, 25, 26, 27, 28:
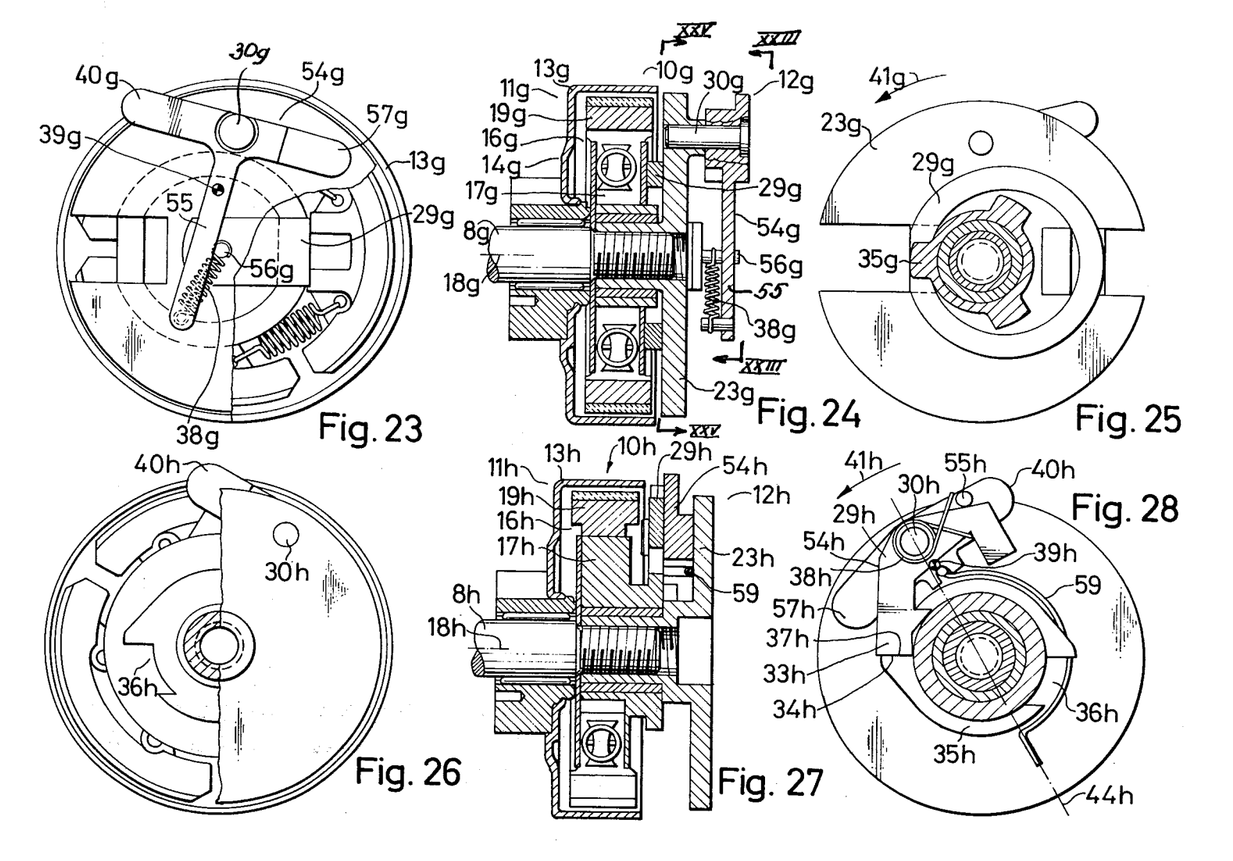
FIGS. 23 – 28 respectively illustrate two additional embodiments of clutches in illustrations somewhat similar to those of FIGS. 20 – 22.

According to the embodiment illustrated in FIGS. 23 – 25, the control member 54g is formed by a T-shaped lever. The T-head web of this lever is in the center of its length in the manner of a two-arm lever journalled on a pivot bolt 30g connected to the drive clutch part 23g and is pivotable about a shaft which is parallel to the rotary shaft 18g and spaced therefrom. The foot web 55 of the control lever 54g is directed approximately toward the rotary shaft 18g of the clutch and when the control member 54g is in its engaging position and when the follower member 29g is in its engaging position engages a pin 56g which is connected to the follower member 29g and protrudes in an axis parallel manner to the clutch. Linked to this pin 56g is a tension spring 38g, or the like, which has its other end linked to the free end of the foot web 55 of the control lever 54g. The two ends of the head web of the control or shift lever 54a form the release cams 40g, 57g. When the shift lever 54g occupies its engaging position, the pertaining disengaging abutment can be moved into the range of rotation of the disengagement release cam 40g whereby the shift lever 40g is centrifuged around the pivot bearing bolt 30g into disengaging control position and in this way by engagement with a pin 56g positively takes the follower member 29g to its disengaging position. The pertaining engaging abutment may now be moved into the range of rotation of the engaging release cam 57g so that the shift lever 54g is again moved to its engagement shift position.

When the speed of the clutch is above the limit speed, the follower member 29g remains in its disengaging position while, however, it is by the preloaded spring 38g urged to its engaging position against the centrifugal force acting thereupon. The follower member 29g is displaceable in an axial plane of the clutch which, however, is located at a right angle to the axial plane which passes through the pivot axis of the shift lever 54g. The shift lever 54g is located on one side of the driving clutch part 23g, namely, on that side which faces away from the flyweight rotor 16g, whereas, the follower member 29g is located on the other side.

According to the embodiments illustrated in FIGS. 26 – 28, the follower member 29h as well as the shift lever 54h are pivotally mounted while the two members are pivotably journalled on a common pivot bearing bolt 30h which is eccentric with regard to the clutch axis. The two members are arranged directly adjacent to each other in such a way that the shift member 54h is located between the follower member 29h and the drive clutch part 23h on that side thereof which faces the flyweight rotor 16h. The shift lever 54h is also in this embodiment T-shaped while its relatively short T-foot web is engaged by an arresting spring 59 on the drive clutch part 23h in such a way that the shift lever 54h in its disengaging position and/or in its engaging position is arrested by a spring force and can be moved into the respective other shifting position by the respective pertaining abutment. The control spring 38h is designed, for instance, as a leg spring which is arranged on the pivot bearing bolt 30h and is, by means of its scissor-like crossing legs resting on one hand on the follower member 29h, and on the other hand on the shift member 54h in such a way that it will spring load the follower member 29h for return position when the shift lever 54h is in its engaging position. The follower 55h is formed by a pin connected to the follower member 54h which pin engages the back surface of one arm of the follower 29h.

The follower lever 29h is designed as a pawl having one of its legs provided with a follower cam 33h pointing to the clutch axis. The counter surfaces 37h which are associated with the follower surface 34h are formed by a ratchet wheel 35h which forms one piece with the rotor support 17h and protrudes beyond the end face thereof toward the drive clutch part 23h. The ratchet wheel 35h has, for instance, two diametrically oppositely located cutouts 36h in the form of tooth spaces which cutouts respectively form a counter surface 37h. The follower cams 33h precisely fit into said cutouts 36h. The pawl 29h is so arranged that it will take along the flyweight rotor 16h by pushing the same when it is in engaged position. Instead of this type of outer teeth, the ratchet wheel may also be provided with inner teeth. Furthermore, it may be expedient to provide a plurality of pawls.

The force (centrifugal or spring force) acting upon the shift member when in engaging position must be greater than the force, for instance, centrifugal force acting on the follower in the direction opposite to the engaging direction. If this requirement is not met, instead of an engagement of the follower member, a redisengagement of the shifting member is effected. This means, for instance, with the embodiment of FIGS. 20 – 22 that with the same shift strokes and central position of the center of gravity of both members relative thereto, the mass of the shift member must be greater than that of the follower member.

It is, of course, to be understood that the present invention is, by no means, limited to the particular showing in the drawings, but also comprises any modifications within the scope of the appended claims.

What is claimed is:

1. A clutch arrangement especially for connecting the motor of a chain saw to a sprocket that drives the chain of the saw and comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, cam element means operatively connected to said second member and adapted for engagement by abutment means interposed in the path of travel of said cam element means to move said second member in at least one of said directions during rotation of said second clutch.

2. A clutch arrangement according to claim 1 in which said cam element means comprises a cam portion formed on said second member and protruding therefrom for engagement by said abutment means.

3. A clutch arrangement according to claim 1 in which said cam element means comprises a lever pivotally carried by said second clutch and operatively connected to said second member and having at least one end portion protruding into position for engagement by said abutment means.

4. A clutch arrangement according to claim 3 in which said second clutch includes a driven input member and said lever is pivotally connected to said input member of said second clutch at a point spaced radially from the axis of said second clutch, the center of gravity of said lever being disposed between said axis and said point and passing over a radius connecting said axis and point when said lever moves between engaged and disengaged positions of said second member, the centrifugal force acting on said lever in each position thereof urging it toward the respective position thereof.

5. A clutch arrangement according to claim 1 which includes resilient means urging said second member relative to said first member in said one direction, said resilient means overcoming the centrifugal force urging said second member toward disengaged position only below a predetermined speed of rotation of said second member on said axis.

6. A clutch arrangement according to claim 1 in which said first and second clutches are coaxial, said first clutch having an input member fixed to said first member of said second clutch, said first and second members of said second clutch having regions which drivingly interengage in said engaged position of said second member to cause power flow from said second clutch to said first clutch.

7. A clutch arrangement according to claim 1, which includes friction means interposed between said first and second members of said second clutch and serving as a synchronizing element.

8. A clutch arrangement according to claim 1 in which said second member has a drive tooth thereon for engagement with said first member, said drive tooth moving radially inwardly to engaged position with said first member.

9. A clutch arrangement according to claim 1 in which said second member has a drive tooth thereon for engagement with said first member, said drive tooth moving radially outwardly to engaged position with said first member.

10. A clutch arrangement especially for connecting the motor of a chain saw to a sprocket that drives the chain of the saw and comprising: a first centrifugal clutch and a second manually controllable clutch in series between the motor and the sprocket, siad second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming said first member of said second clutch and said second member having tooth means engageable with said slot means in engaged position of said second member, the center of gravity of said second member moving across the said axis as said second member moves between said positions thereof whereby the centrifugal force acting on said second member urges it toward the respective position occupied thereby.

11. A clutch arrangement according to claim 10 in which said first and second clutches are coaxial and during movement of said second member between the said positions thereof said center of gravity moves from one side to the other of that axial plane which is perpendicular to the direction of movement of said second member.

12. A clutch arrangement especially for connecting the motor of a chain saw to a sprocket that drives the chain of the saw and comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming said first member of said second clutch and said second member having tooth means engageable with said slot means in engaged position of said second member, said second clutch including a driven input member and said second member being a lever pivotally mounted on said input member at a point radially spaced from the axis of the clutch, the center of gravity of said lever being disposed between said axis and said point when moving across a radius connecting the axis and the point when the lever moves between engaged and disengaged positions thereof, the centrifugal force acting on said lever in each position thereof urging the lever toward the respective position occupied thereby.

13. A clutch arrangement according to claim 1 which includes a shift member coaxial with said lever and having end parts which protrude for engagement by said abutment means, said shift member abutting said lever for movement of the lever into disengaged position and resilient means engaging the shift member and the lever for movement of the lever toward engaged position, said shift member having a center of gravity so disposed as to urge said shift member toward each of the shifted positions thereof when the shift member is moved by said abutment means into a respective position.

14. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, said first and second clutches being coaxial, said first clutch having an input member fixed to said first member of said second clutch, said first and second members of said second clutch having regions which drivingly interengage in said engaged position of said second member to cause power flow from said second clutch to said first clutch, said first clutch comprising an output member fixed to the sprocket and said second clutch comprising an input member drivingly connected to said second member, and the motor having an outout shaft fixed to said input member of said second clutch.

15. A clutch arrangement according to claim 2, which includes friction means interposed between said first and second members of said second clutch and serving as a synchronizing element.

16. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming said first member of said second clutch and said second member having tooth means engageable with said slot means in engaged position of said second member, the motor having an output shaft and said first clutch being adjacent said motor and having an input member rotatable on the output shaft and an output member in the form of a drum connected to the sprocket, said second clutch having an input member fixed to the motor output shaft and drivingly connected to said second member, said first member of said second clutch being fixed to the input member of said first clutch, said second clutch being positioned on the opposite side of said first clutch from said motor.

17. A clutch arrangement according to claim 16 in which said drum is closed on the motor side thereof and is connected to the sprocket on the motor side thereof, said second clutch being adjacent said drum on the open side thereof.

18. A clutch arrangement especially for connecting the motor of a chain saw to a sprocket that drives the chain of the saw and comprising in combination; a first centrifugal clutch and a second manually controllable clutch in series between the motor and the sprocket, said second clutch comprising a first member and a second member both rotatable about the clutch axis, said second member being moveable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member.

19. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, said first member of said second clutch comprising an axial portion formed on said first clutch and having oppositely facing side surfaces.

20. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, abutment means engageable with said second member in engaged position thereof.

21. A clutch arrangement, especially for connecting the motor of a chain saw to a sprocket that drives the chain of the saw and comprising in combination: a first centrifugal clutch and a second manually controllable clutch in series between the motor and the sprocket, said second clutch comprising a first member and a second member both rotatable about the clutch axis, said second member being moveable in one direction into engaged position with said first member in complementary relationship and in the other direction into disengaged position from said first member, said second member being subject to centrifugal force when said second clutch rotates, said centrifugal force in at least disengaged position of said second member urging said second member toward respective position thereof, said second clutch comprising an input member having diametral slot means, said second member slidably engaging said slot means, and resilient means acting between said input member and second member urging said second member toward disengaged position.

22. A clutch arrangement, especially for connecting the motor of a chain saw to a sprocket that drives the chain of the saw and comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward respective position thereof, said second clutch comprising an input member having diametral slot means, said second member slidably engaging said slot means, and resilient means acting between said input member and second member urging said second member toward disengaged position, said second member comprising an annular portion which surrounds said first member.

23. A clutch arrangement according to claim 22 in which said annular portion has a gap therein to receive a drive tooth on said first part, the inner surface of said annular portion of said second member being in the form of a spiral which increases in radius from the driving side of said gap to the other side thereof.

24. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, said first clutch comprising a plurality of flyweights, said first member of said second clutch comprising axial projections on said weights forming radial slots therebetween, said second member of said second clutch comprising pivotal levers having portions engageable with said slots.

25. A clutch arrangement, especially for connecting the motor of a chain saw to a sprocket that drives the chain of the saw and comprising in combination: a first centrifugal clutch and a second manually controllable clutch in series between the motor and the sprocket, said second clutch comprising a first member and a second member both rotatable about the clutch axis, said second member being moveable in one direction into engaged position with said first member in complementary relationship and in the other direction into disengaged position from said first member, said second member being subject to centrifugal force in at least disengaged position of said second member urging said second member toward the respective position thereof, said second member of said second clutch having a drive tooth thereon, said first member of said second clutch being fixed to said first clutch and having circumferentially spaced recesses for receiving said tooth in engaged position of said second member.

26. A clutch arrangement, especially for connecting the motor of a chain saw to a sprocket that drives the chain of the saw and comprising: a first centrifugal clutch and a second manually controllable clutch in series between the motor and the sprocket, said second clutch comprising a first member and a second member both rotatable about the clutch axis, said second member being moveable in one direction into engaged position with said first member and in the other direction into disengaged position from said first member, said second member being subject to centrifugal force when said second clutch rotates, said centrifugal force in at least disengaged position of said second member urging said second member toward the respective position thereof, said second member having two cam elements operatively associated therewith to move the second member in respective direction, each cam element being disposed in a respective axial plane and adapted for actuating engagement by a respective abutment.

27. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, two cam elements operatively associated with said second member for movement thereof in respective direction, an abutment for each cam element, said abutments being movable between effective and ineffective positions and being connected to the actuating member of a friction brake for the saw chain for movement thereby.

28. A clutch arrangement according to claim 27 in which application of said brake makes the disengaging abutment effective while releasing of said brake makes the engaging abutment effective.

29. A clutch arrangement especially for connecting the motor of a chain saw to a sprocket that drives the chain of the saw comprising: a first centrifugal clutch and a second manually controllable clutch in series between the motor and the sprocket, said second clutch comprising a first member and a second member both rotatable about the clutch axis, said second member being movable in one direction into engaged position with said first member in complementary relationship and in the other direction into disengaged position from said first member, said second member being subject to centrifugal force when said second clutch rotates, said centrifugal force in at least disengaged position of said second member urging said second member toward the respective position thereof, said first clutch comprising weight means which move radially outwardly to cause engagement of said first clutch, said weight means having radial slot means forming the said first member of said second clutch and said second member having tooth means engageable with said slot means in engaged position of said second member, two cam elements operatively associated with said second member for movement thereof in respective direction, an abutment for each cam element, said abutments being movable betweeen effective and ineffective positions and at least the disengaging abutment is adapted for control independently of the engaging abutment.

* * * * *